US010031271B2

(12) United States Patent
Brune et al.

(10) Patent No.: US 10,031,271 B2
(45) Date of Patent: Jul. 24, 2018

(54) LASER-OPERATED LIGHT SOURCE

(71) Applicant: ASML Netherlands B.V., Veldhoven (NL)

(72) Inventors: Ekkehard Brune, Göttingen (DE); Dieter Frerking, Gladebeck (DE); Thomas Thöniβ, Göttingen (DE); Claus Spruch, Göttingen (DE)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 14/490,966

(22) Filed: Sep. 19, 2014

(65) Prior Publication Data
US 2015/0085516 A1 Mar. 26, 2015

(30) Foreign Application Priority Data

Sep. 20, 2013 (DE) .................. 10 2013 110 390

(51) Int. Cl.
*F21V 7/04* (2006.01)
*F21V 8/00* (2006.01)
(Continued)

(52) U.S. Cl.
CPC ............ *G02B 6/0006* (2013.01); *G02B 6/14* (2013.01); *G02B 27/0994* (2013.01); *H01J 65/04* (2013.01); *H01S 3/005* (2013.01)

(58) Field of Classification Search
CPC ... G02B 6/0006; G02B 27/0994; H01J 65/04; H01S 3/005; A61B 1/00117; A61B 1/00165; A61B 1/00183; A61B 1/07
(Continued)

(56) References Cited

U.S. PATENT DOCUMENTS 3,502,929 A 3/1970 Richter
3,619,588 A 11/1971 Chambers
(Continued)

FOREIGN PATENT DOCUMENTS

EP 0353690 A2 2/1990
EP 1731933 A1 12/2006
(Continued)

OTHER PUBLICATIONS

Extended European Search Report for application 14185633.6, dated Feb. 17, 2015.
(Continued)

*Primary Examiner* — Anh Mai
*Assistant Examiner* — Matthew Peerce
(74) *Attorney, Agent, or Firm* — Sterne, Kessler, Goldstein & Fox P.L.L.C.

(57) ABSTRACT

A laser-operated light source encompasses a chamber for accommodating an ionizable gas and an ignition source for ionizing the gas in the chamber for generating a plasma. The light source furthermore encompasses a laser for inputting laser energy into the plasma such that, under the impact of the laser radiation, the plasma emits useful light, which forms the output signal of the light source, wherein provision is made for means for coupling the useful light into a transferring optical fiber. In the case of the light source according to the invention, at least one mode scrambler is assigned to the optical fiber or the optical fibers.

10 Claims, 3 Drawing Sheets

(51) Int. Cl.
　　　G02B 27/09　　(2006.01)
　　　G02B 6/14　　(2006.01)
　　　H01S 3/00　　(2006.01)
　　　H01J 65/04　　(2006.01)

(58) Field of Classification Search
　　　USPC ........................................................ 362/553
　　　See application file for complete search history.

(56) References Cited

U.S. PATENT DOCUMENTS

| | | | |
|---|---|---|---|
| 3,826,996 A | 7/1974 | Jaegle | |
| 3,900,803 A | 8/1975 | Silfvast et al. | |
| 4,088,966 A | 5/1978 | Samis | |
| 4,152,625 A | 5/1979 | Conrad | |
| 4,403,273 A | 9/1983 | Nishioka | |
| 4,498,029 A | 2/1985 | Yoshizawa | |
| 4,646,215 A | 2/1987 | Levin | |
| RE32,626 E | 3/1988 | Yoshizawa | |
| 4,738,748 A | 4/1988 | Kisa | |
| 4,780,608 A | 10/1988 | Cross et al. | |
| 4,789,788 A | 12/1988 | Cox | |
| 4,866,517 A | 9/1989 | Mochizuki et al. | |
| 4,901,330 A | 2/1990 | Wolfram | |
| 5,479,545 A * | 12/1995 | Davenport | G02B 6/0005 |
| | | | 362/552 |
| 5,747,813 A | 5/1998 | Norton et al. | |
| 5,905,268 A | 5/1999 | Garcia | |
| 5,940,182 A | 8/1999 | Lepper, Jr. et al. | |
| 6,184,517 B1 | 2/2001 | Sawada | |
| 6,288,780 B1 | 9/2001 | Fairley et al. | |
| 6,414,436 B1 | 7/2002 | Eastlund | |
| 6,417,625 B1 | 7/2002 | Brooks et al. | |
| 6,541,924 B1 | 4/2003 | Kane et al. | |
| 6,679,276 B1 | 1/2004 | Brown et al. | |
| 6,737,809 B2 | 5/2004 | Espiau et al. | |
| 6,762,849 B1 | 7/2004 | Rulkens | |
| 6,788,404 B2 | 9/2004 | Lange | |
| 6,956,329 B2 | 10/2005 | Brooks et al. | |
| 6,960,872 B2 | 11/2005 | Beeson | |
| 6,972,421 B2 | 12/2005 | Melnychuk | |
| 7,050,149 B2 | 5/2006 | Owa et al. | |
| 7,295,739 B2 | 11/2007 | Solarz | |
| 7,307,375 B2 | 12/2007 | Smith | |
| 7,390,116 B2 | 6/2008 | Jain | |
| 7,427,167 B2 | 9/2008 | Holder et al. | |
| 7,429,818 B2 | 9/2008 | Chang et al. | |
| 7,435,982 B2 | 10/2008 | Smith | |
| 7,439,530 B2 | 10/2008 | Ershov | |
| 7,652,430 B1 | 1/2010 | Delgado | |
| 7,679,276 B2 | 3/2010 | Blondia | |
| 7,705,331 B1 | 4/2010 | Kirk | |
| 7,744,241 B2 | 6/2010 | Xu | |
| 7,786,455 B2 | 8/2010 | Smith | |
| 7,989,786 B2 | 8/2011 | Smith | |
| 8,192,053 B2 | 6/2012 | Owen et al. | |
| 8,309,943 B2 | 11/2012 | Smith | |
| 8,525,138 B2 | 9/2013 | Smith | |
| 8,969,841 B2 | 3/2015 | Smith | |
| 9,048,000 B2 | 6/2015 | Smith | |
| 9,185,786 B2 | 11/2015 | Smith | |
| 2001/0016430 A1 | 8/2001 | Nakano | |
| 2001/0035720 A1 | 11/2001 | Guthrie et al. | |
| 2002/0021508 A1 | 2/2002 | Ishihara | |
| 2002/0044629 A1 | 4/2002 | Hertz | |
| 2002/0080834 A1 | 6/2002 | Kusunose | |
| 2002/0172235 A1 | 11/2002 | Chang | |
| 2003/0052609 A1 | 3/2003 | Eastlund | |
| 2003/0068012 A1 | 4/2003 | Ahmad | |
| 2003/0147499 A1 | 8/2003 | Kondo | |
| 2003/0168982 A1 | 9/2003 | Kim | |
| 2003/0231496 A1 | 12/2003 | Sato | |
| 2004/0016894 A1 | 1/2004 | Wester | |
| 2004/0026512 A1 | 2/2004 | Otsubo | |
| 2004/0129896 A1 | 7/2004 | Schmidt | |
| 2004/0183031 A1 | 9/2004 | Silverman | |
| 2004/0183038 A1 | 9/2004 | Hiramoto et al. | |
| 2004/0196459 A1 * | 10/2004 | Cyr | G01N 21/31 |
| | | | 356/344 |
| 2004/0238762 A1 | 12/2004 | Mizoguchi et al. | |
| 2004/0264512 A1 | 12/2004 | Hartlove et al. | |
| 2005/0167618 A1 | 8/2005 | Hoshino et al. | |
| 2005/0205811 A1 | 9/2005 | Partlo et al. | |
| 2005/0207454 A1 | 9/2005 | Staradoumov et al. | |
| 2005/0225739 A1 | 10/2005 | Hiura | |
| 2005/0243390 A1 | 11/2005 | Tejnil | |
| 2006/0039435 A1 | 2/2006 | Cheymol | |
| 2006/0097203 A1 | 5/2006 | Bykanov et al. | |
| 2006/0109455 A1 | 5/2006 | Haverlag | |
| 2006/0152128 A1 | 7/2006 | Manning | |
| 2006/0192152 A1 | 8/2006 | Ershov | |
| 2006/0219957 A1 | 10/2006 | Ershov | |
| 2007/0228288 A1 | 10/2007 | Smith | |
| 2007/0228300 A1 | 10/2007 | Smith | |
| 2007/0285921 A1 | 12/2007 | Zulim et al. | |
| 2008/0055712 A1 | 3/2008 | Noelscher | |
| 2008/0279523 A1 | 11/2008 | Fujimoto et al. | |
| 2009/0208170 A1 | 8/2009 | Moriarty | |
| 2009/0245303 A1 * | 10/2009 | Shimotsu | H01S 3/2383 |
| | | | 372/27 |
| 2011/0181191 A1 * | 7/2011 | Smith | B82Y 10/00 |
| | | | 315/149 |
| 2013/0293874 A1 * | 11/2013 | Goldstein | G01M 11/088 |
| | | | 356/73.1 |
| 2016/0057845 A1 | 2/2016 | Smith | |

FOREIGN PATENT DOCUMENTS

| | | |
|---|---|---|
| FR | 2554302 A | 5/1985 |
| JP | 59126503 A | 7/1984 |
| JP | S61-193358 A | 8/1986 |
| JP | H04-144053 A | 5/1992 |
| JP | 08299951 | 11/1996 |
| JP | 2003-317675 A | 11/2003 |
| JP | 2006010675 A | 1/2006 |
| JP | 2002133926 A | 5/2010 |
| WO | 2004097520 A2 | 11/2004 |
| WO | 2005086369 A1 | 9/2005 |
| WO | WO2007120521 | 10/2007 |
| WO | WO2010002766 | 1/2010 |
| WO | 2010093903 | 8/2010 |
| WO | 2014000998 A1 | 1/2014 |

OTHER PUBLICATIONS

Bussiahn, R. et al, "Experimental and theoretical investigations of a low-pressure He—Xe discharge for lighting purpose" Journal of Applied Physics, vol. 95, No. 9, May 1, 2004, pp. 4627-4634.

Beck, Simple Pulse Generator for Pulsing Xenon Arcs with High Repetition Rate, Rev. Sci. Instrum., vol. 45, No. 2, Feb. 1974, pp. 318-319.

Carlhoff, et al, "Continuous Optical Discharges at Very High Pressure," Physica 103C, pp. 439-447.

Fiedorowicz et al, X-Ray Emission from Laser-Irradiated Gas Puff Targets, Appl. Phys. Lett. 62 (22), May 31, 1993.

Franzen, "CW Gas Breakdown in Argon Using 10.6-um Laser Radiation," Appl. Phys. Lett, vol. 21, No. 2 Jul. 15, 1972 pp. 62-64.

Generalov et al "Continuous Optical Discharge," ZhETF Pis. Red. 11, No. 9, May 5, 1970, pp. 302-304.

Jeng et al, Theoretical Investigation of Laser-sustained Argon Plasmas J.Appl.Phys. 60 (7), Oct. 1, 1986 pp. 2272-2279.

Nakar, "Radiometric Characterization of Ultrahigh Radiance Xenon Short-arc Discharge Lamps" Applied Optics, vol. 47 No. 2, Jan. 9, 2008, pp. 224-229.

Moody, "Maintenance of a Gas Breakdown in Argon Using 10.6-u cw Radiation," Journal of Applied Physics, vol. 46 No. 6, Jun. 1975, pp. 2475-2482.

Keefer, et al "Experimental Study of a Stationary Lesser-Sustained Air Plasma", Journal of Applied Physics, vol. 46., No. 3, Mar. 1975, pp. 1080-1083.

(56) References Cited

OTHER PUBLICATIONS

DS004 EQ-10M—Data Sheet, Energetiq, 2005.
John Powell anad Claes Magnusson; Handbook of Laser Technologies and Applications vol. III Applications, Part D:1.2, pp. 1587-1611; 2004, published by Institute of Physics Publishing.
Digonnet, Michel J.F., editor; Rare-Earth-Doped-Fiber Lasers and Amplifiers, Second Edition, Revised and Expanded published by Marcel Dekker, Inc., 2001, pp. 144-170.
Cremers, et al; Evaluation of the Continuous Optical Discharge for Spectrochemical Analysis; Spechtrochimica Acta, Part B. Atomic Spectroscopy; vol. 40B No. 4, 1985.
ASML's customer magazine, 2014, ASML Holding BV.
Raizer, Yuri P.; Gas Discharge Physics, Springer-Verlag 1991; pp. 35-51; 307-310.
Raizer, Yuri P.; Gas Discharge Physics, Springer-Verlag corrected and printing 1997; pp. 35-51; 307-310.
V. P. Zimakov, et al; Interaction of Near-IR Laser Radiation with Plasma of a Continuous Optical Discharge; Plasma Physics Reports, 2016, vol. 42, No. 1, pp. 68-73.
Bezel, et al "High Power Laser-Sustained Light Sources for KLA-Tencor Broadband Inspection Tool"; Conference Paper May 2015, KLATencor, Milpitas, California.
Energetiq Technology, Inc.; LDLS™ Laser-Driven Light Source EQ-1000 High Brightness DUV Light Source Data Sheet; 2008; Woburn Massachusetts.
Rudoy, et al; Xenon Plasma Sustained by Pulse-Periodic Laser Radiation; Plasma Physics Reports, 2015, vol. 41, No. 10, pp. 858-861, Pleiades Publishing, Ltd., 2015.
Knecht, et al; Optical pumping of the XeF(C-+A) and iodine 1.315-pm lasers by a compact surface discharge system; Opt. Eng. 42(12) 3612-3621 (Dec. 2003).
Fridman, et al; Plasma Physics and Engineering; Published in 2004 by Taylor & Francis, pp. 404-419, 618-619.
Model EQ-99 LDLS™ Laser-Driven Light Source; Operation and Maintenance Manual Revision Mar. 2, 2012.
Martin van den Brink; Many ways to shrink: The right moves to 10 nanometer and beyond; Presentation at ASML SmallTalk 2014; London; Nov. 2014.
Laser Pumped Plasma Broadband Light Source by RnD Isan (no date).
Toumanov, Plasma and High Frequency Processes for Obtaining and Processing Materials in the Nuclear Fuel Cycle; Nova Science Publishers, Inc., New York, 2003, p. 60.
Klauminzer; Cost Considerations for Industrial Excimer Lasers; Laser Focus, The Magazine of Electro-Optics Technology; Dec. 1985.
S. C. Tidwell, ; Highly efficient 60-W TEMoo cw diode-and-pumped Nd:YAG laser; Optics Letters / vol. 18, No. 2 / Jan. 15, 1993, pp. 116-118.
R. J. Shine, Jr; 40-W cw, TEM00-mode, diode-laser-pumped, Nd:YAG miniature-slab laser; Mar. 1, 1995/ vol. 20, No. 5 / Optics Letters; pp. 459-461.
W. Schone, et al; Diode-Pumped High-Power cw Nd:YAG Lasers; W. Waidelich, et al (eds.); Laser in Forschung and Technik; 1996.
Diogiovanni, et al; High Power Fiber Lasers and Amplifiers; Optics & Photonics News, Jan. 1999.
ASML YieldStar T-250D product sheet; ASML Product Catalog; Jan. 20, 2014.
ASML YieldStar S-250D product sheet; SML Product Catalog, Jan. 20, 2014.
Energetig Technology Inc; Operation manual for LDLS™ Laser-Driven Light Source; Aug. 2009.
Bussiahn; Experimental and theoretical investigations of a low-pressure HE—Xe discharge for lighting purpose; Jounral of Applied Physics vol. 95, No. 9 May 1, 2004.
V.P. Zimakov, et al; Bistable behavior of a continuous optical discharge as a laser beam propagation effect; Laser Resonators, Microresonators, and Beam Control XV; vol. 8600, 860002 © 2003 SPIE.
Fridman, et al; Plasma Physics and Engineering, Second Edition: Published in 2011 by Taylor & Francis, pp. 409-424; 639-840.
Energetiq Technology, Inc.; Model EQ-1500. LDLS™ Laser-Driven Light Source, Operation Manual, May 2011.
Energetiq Technology, Inc.; Model EQ-77 LDLS™ Laser-Driven Light Source Operation Manual, Dec. 2015.
Energetiq Technology, Inc.; Model EQ-90-FC, LDLS™, Laser-Driven Light Source, Operation and Maintenance Manual, Jan. 2014.
Raizer, "Optical discharges," Soviet Physics Uspekhi 23(11) (1980).
Energetiq Technolody, Inc.; Operation and Maintenance Manual, Model EQ-99X, LDLS Laser-Driven, Light Source, Rev. 1 (Jan. 2014).
Energetiq Technology, Inc.; Operation and Maintenance Manual, Model EQ-99-FC, LDLS Laser-Driven Light Source, Rev. 2 (Mar. 2012).
Energetiq Technology, Inc.; Operation and Maintenance Manual, Model EQ-99X-FC, LDLS Laser Driven Light Source, Rev, 1 (Jan. 2014).
Energetiq Technology, Inc,; Operation and Maintenance Manual, Model EQ-9-N, LDLS Laser-Driven Light Source, Rev. 6 (Sep. 2015).
Energetiq Technology, Inc.; A presentation titled "EQ-400 LDLS Laser-Driven Light Source," dated Feb. 2, 2015.
A presentation titled "Energetiq Laser-Driven Light Sources," dated Apr. 21, 2015.
Ytterbium-doped large-core fibre laser Letters with 1 kW of continuous-wave output power; Y. Jeong, et al; Electronics Letters Apr. 15, 2004 vol. 40 No. 8.
Nanometrics, Organic Growth Opportunities for Nanometrics in Process Control, Jan. 2016.
A presentation titled "LDLS Laser-Driven Light Source," dated Jul. 8, 2011.
Castellano, "Are the Brains At ASML Hurting Investors With High and Ambitious R&D Costs?" Jul. 20, 2015.
M. W. P. Cann, Light Sources in the 0.15-20-µ Spectral Range, vol. 8, No. 8 Applied Optics (1969).
Kuhn, Kelin; Laser Engineering; Prentice-hall Inc, 1998; pp. 384-440.
Moulton, Peter F.; Tunable Solid-State Lasers; Proceedings of the IEEE, vol. 80, No. 3, Mar. 1992.
Koch, K.K.; Sodium Plasma Produced by Milliwatt cw Laser Irradiation; Journal of the Optical Society of America; vol. 70, No. 6; Jun. 1980.
E. B. Saloman; Energy Levels and Observed Spectral Lines of Xenon, XeI through XeLIV; J. Phys. Chem. Ref. Data, vol. 33, No. 3, 2004.
Lothar Klein; Measurements of Spectral Emission and Absorption of a High Pressure Xenon Arc in the Stationary and the Flashed Modes; Apr. 1968; vol. 7, No. 4, Applied Optics.
Hailong Zhou, et al; Conductively cooled high-power, high-brightness bars and fiber coupled arrays; High-Power Diode Laser Technology and Applications III, edited by Mark S. Zediker, Proc. of SPIE vol. 5711 (SPIE, Bellingham, WA, 2005).
I.M. Beterov et al., "Resonance radiation plasma (photoresonance plasma)", Sov. Phys. Usp. 31 (6), 535 (1988).
D. Keefer, "Laser Sustained Plasmas," Chapter 4, in Radziemski et al., "Laser-Induced Plasmas and Applications," CRC Press (1989).
Norbert R. Böwering et al., "EUV Source Collector," Proc. of SPIE vol. 6151, (Mar. 10, 2006).
William T. Silfvast, Laser Fundamentals, 2d ed., pp. 1-6 (2004).
Arp et al., Feasibility of generating a useful laser-induced breakdown spectroscopy plasma on rocks at high pressure: preliminary study for a Venus mssion, published Jul. 30, 2004.
J. Unlenbusch and W, Viöl, "Hβ-Line Profile Measurements in Optical Discharges", J. Quant. Spectrosc. Radiat. Transfer, vol. 44, No. 1, 47-56 (1990).
M.J. Soileau et al., Laser-Induced Damage Measurements in CdTe and Other II-VI Materials, Applied Optics, vol. 21, No. 22, pp. 4059-4062, Nov. 15, 1982.
H.M. Pask, et al; Ytterbium-Doped Silica Fiber Lasers: Versatile Sources for the 1-1.2 um Region; IEEE Journal of Selected Topics in Quantum Electronics vol. 1, No. 1; Apr. 1993.

(56) References Cited

OTHER PUBLICATIONS

Christian Stewen; A 1-kW CW Thin Disc Laser; IEEE Journal of Selected Topics in Quantum Electronics, vol. 6, No. 4, Jul./Aug. 2000.

Hecht, Eugene; Optics, 4ed; Pearson Addison Wesley; 2002; pp. 149-171, 243-273, 385-442.

KLA-TENCOR; High Power Laser-Sustained Plasma Light Sources for KLA-Tencor Broadband Inspection Tools; Conference Paper May 2015.

Davis, Christopher C.; Lasers and Electro-Optics; Fundamentals and Engineering; 1996, Cambridge University Press, pp. 14-35.

Tam, Quasiresonant laser-produced plasma: an efficient mechanism for localized breakdown; J. Appl. Phys. 51(9), Sep. 1980, p. 4682.

Measures, et al; Laser Interaction based on resonance saturation (LIBORS): an alternative to inverse bremsstrahlung for coupling laser energy into a plasma; Applied Optics, vol. 18, No. 11. Jun. 1, 1979.

Eletskii et al; Formation kinetics and parameters of a photoresonant plasma; Sov. Phys. JETP 67 (5); May 1988.

Ballman, et al; Synthetic Quartz with High Ultraviolet Transmission; Applied Optics; Jul. 1988, vol. 7, No. 7.

KLA-Tencor Launches 2830 and Puma 9500 Series, eDR-5210 | Product Releases | Press Releases; Jul. 13, 2009.

Patel and Zaidi, The suitability of sapphire for laser windows, MEas. Sci. Technol. 10 (1999).

Waynant, et al; Electro-Optics Handbook, Second Edition; Chapter 10; published by McGraw-Hill, 2000.

Excelitas Technologies Corp.; Cermax® Xenon Lamp Engineering Guide, 2011.

Perkinelmer Optoelectronics: Cermax® Xenon Lamp Engineering Guide, 1998.

G C Wei; Transparent ceramic lamp envelope materials; J. Phys. D; Appl. Phys. 38 (2005) 3057-3065.

PASCO Scientific; Instruction Sheet for the PASCO Model OS-9286A Mercury Vapor Light Source; 1990.

Generalov et al; "Continuous Optical Discharge," ZhETF Pis. Red. 11, No. 9, May 5, 1970, pp. 302-304.

Kozlov et al; "Radiative Losses by Argon Plasma and the Emissive Model of a Continuous Optical Discharge"; Sov. Phys.JETP, vol. 39, No. 3, Sep. 1974, pp. 463-468.

Wilbers et al, "The Continuum Emission of an Arc Plasma," J. Quant. Spectrosc. Radiat. Transfer, vol. 45, No. 1, 1991, pp. 1-10.

Wilbers, et al "The VUV Emissitivity of a High-Pressure Cascade Argon Arc from 125 to 200 nm," J.Quant. Spectrosc. Radial. Transfer, vol. 46, 1991, pp. 299-308.

Luxtell LLC CeraLux Xenon Lamps Product Data Sheet; 2003-2004.

Laufer, Gabriel; Introduction to Optics and Lasers in Engineering; pp. 449-454; Cambridge University Press, 1996.

Yu, et al; LED-Based Projection Systems; Journal of Display Technology, vol. 3, No. 3, Sep. 2007.

Derra et al; UHP lamp systems for projection applications; J. Phys. D: Appl. Phys. 38 (2005) 2995-3010.

Ingle, James D., et al; Spectrochemical Analysis; 1988, Prentice-Hall Inc.; p. 59.

M.J, Soileau et al., Laser-Induced Damage Measurements in CdTe and Other II-VI Materials, Applied Optics, vol. 21, No. 22, pp. 4059-4062.

Roy Henderson et al., Laser Safety; pp. 435-443 (2004).

Turan Erdogan, Ph.D., CTO Semrock, Inc., A Unit of IDEX Corp; letter dated Feb. 28, 2011 regarding Energetiq Technology's EQ-99 system.

Winners of 2010 Prism Awards Announced, Jan. 27, 2011; webpage from photonics.com.

http://www.rdmag.com/award-winners/2011/08/light-source-life-time-lifted-laser-tech; the EQ-99 LDLS Laser-Driven Light Source, produced by Energetiq Technology Inc. 2011.

Energetiq Technology Inc. Press Release: Energetiq Announces Ultra-Compact Light Source for Next Generation HPLC and Advanced Microscopy; Jan. 21, 2010.

Luxtell LLC CeraLux Xenon Lamps Product Data Sheet, 2003-2004.

M.J. Soileau et al., Laser-Induced Damage Measurements in CdTe and Other II-VI Materials, Applied Optics, vol. 21, No. 22, pp. 4059-4062.

Roy Henderson et al., Laser Safety, pp. 435-443 (2004).

Energetiq Technology Inc, Press Release: Energetiq Announces Ultra-Compact Light Source for Next Generation HPLC and Advanced Microscopy; Jan. 21, 2010.

\* cited by examiner

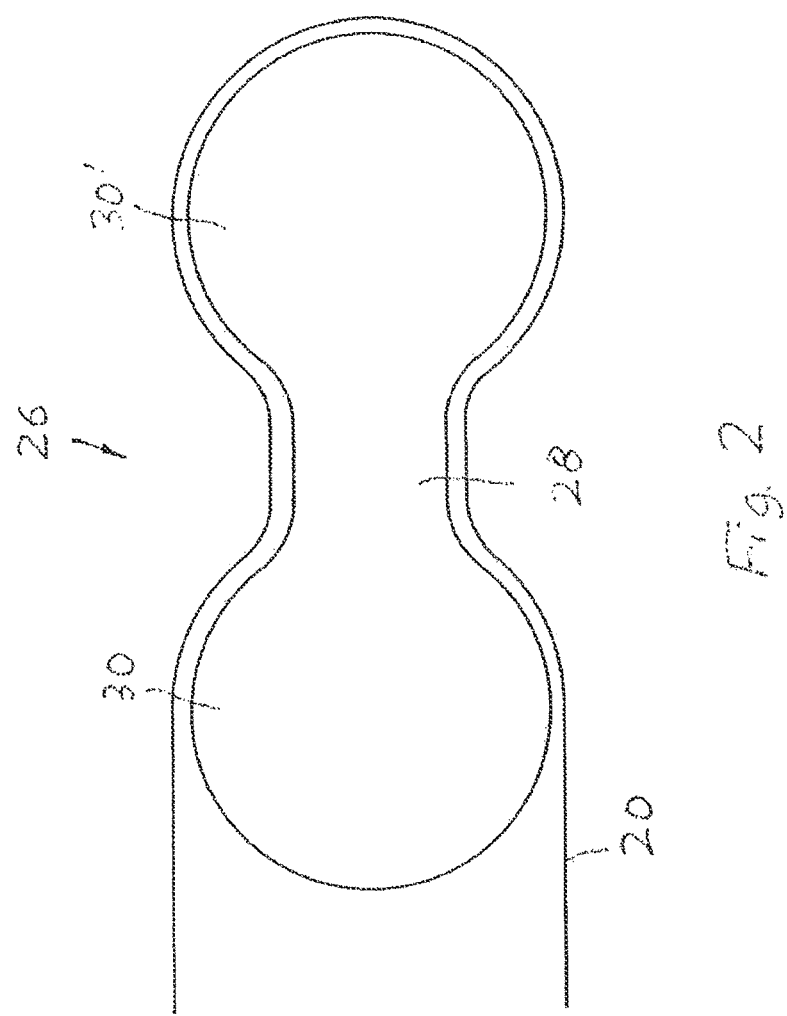

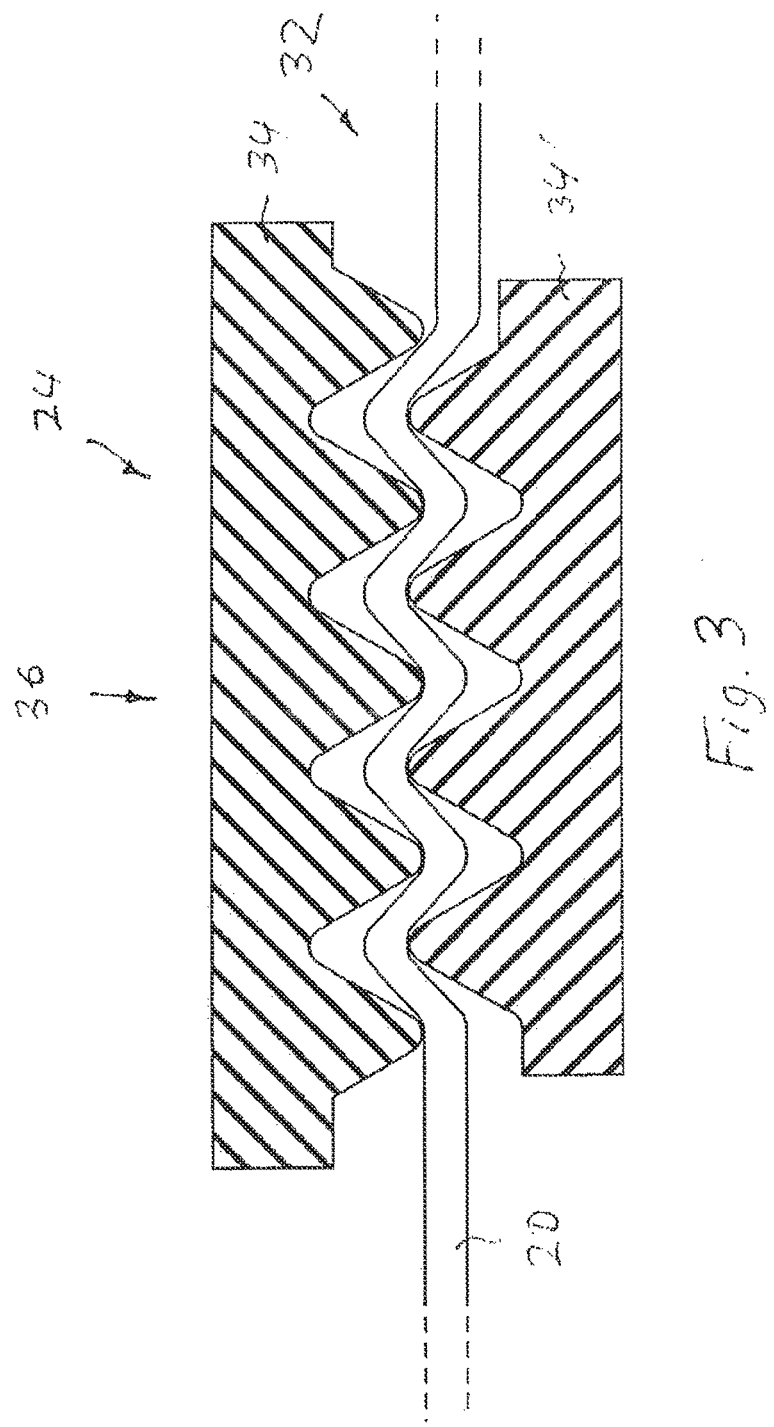

LASER-OPERATED LIGHT SOURCE

FIELD OF THE INVENTION

The present invention is generally related to laser-operated light sources.

CROSS-REFERENCE TO RELATED APPLICATIONS

This application claims the benefit of German Patent Application serial number 10 2013 110 390.1, filed Sep. 20, 2013, entitled "Laser-Operated Light Source," which is incorporated by reference herein in its entirety.

BACKGROUND OF THE INVENTION

Laser-operated light sources are generally known and are used in spectroscopy or surface inspection, for example for measuring purposes. In some instances, these laser-operated light sources can include a chamber for accommodating a gaseous medium that is used to generate plasma. The plasma, in response to being irradiated with laser radiation, can emit radiation that is useable in connection with a various processes in the semiconductor industry, as well as other industries.

A need exists for technology that can produce light with enhanced homeneity for use in applications such as these.

SUMMARY OF THE INVENTION

Embodiments of the present invention provide a laser-operated light source.

A laser-operated light source is disclosed that includes a chamber for accommodating an ionizable gas, an ignition source for ionizing the ionizable gas in the chamber for generating a plasma, a laser for inputting laser energy into the plasma. Under the impact of the laser energy, the plasma emits light (e.g., having a wavelength between 400 nm and 950 nm). One or more optical fibers are configured to carry the light emitted by the plasma to a location for use in connection with a process. At least one mode scrambler associated with the one or more optical fibers.

In some implementations, the at least one mode scrambler includes: a first mode scrambler configured to bend the one or more optical fibers to a first bend radius; and a second mode scrambler configured to bend the one or more optical fibers to a second bend radius. The first bend radius may be different (e.g., larger) than the second bend radius.

The laser-operated light sources, which will also be referred to in short as light sources hereinbelow, encompass a chamber for accommodating an ionizable gas, which can be a noble gas, for example. The light sources furthermore encompass an ignition source for ionizing the gas in the chamber for generating a plasma, where the ignition source can be formed by means of an electrode pair, for example. Other ignition sources, however, are also possible. The light sources furthermore encompass a laser for inputting laser energy into the plasma such that, under the impact of the laser radiation, the plasma generates useful light, which forms the output signal of the light source. For transferring the useful light to a downstream process, for example in the case of spectroscopy or surface inspection, the light sources encompass means for coupling the useful light into a transferring optical fiber, which can be formed by means of a fiber coupler, for example.

Briefly described, in architecture, one embodiment of the light source, among others, can be implemented as follows. The laser-operated light source has a chamber for accommodating an ionizable gas, an ignition source for ionizing the gas in the chamber for generating a plasma, a laser for inputting laser energy into the plasma such that, under the impact of the laser radiation, the plasma emits useful light, which forms the output signal of the light source, and means for coupling the useful light into at least one transferring optical fiber. At least one mode scrambler is assigned to the optical fiber and the optical fibers.

In a typical implementation, a mode scrambler is a device that induces mode mixing in one or more optical fibers. More particularly, in a typical implementation, a mode is configured to physically bend one or more optical fibers. Mode scramblers can have a variety of different physical configurations including, for example, the configurations shown in FIGS. 2 and 3 of the present application and discussed herein.

In some implementations, the concepts disclosed herein can improve optical quality of light from a laser-operated light source. More particularly, in a typical implementation, the improved quality can be embodied by a high degree of homogeneity (e.g., angular homogeneity). Angular homogeneity refers generally to the degree of uniformity in light intensity that is being delivered for example to an end process (e.g., a surface inspection process), across a range of angles. The range of angles can vary from application to application depending, for example, on the size and configuration of the aperture through which the light is being delivered. In one example, the angular range is approximately 14 degrees (e.g., between about 10 degrees and 20 degrees), but, of course, other angular ranges are possible as well.

One or more of the concepts disclosed herein are based on the knowledge that the characteristics of laser-operated light sources are in practice often affected negatively in that the light emitted by the light source, measured by the demands of a downstream process, for example in the case of spectroscopy or surface inspection, does not encompass a sufficient angular homogeneity. The invention is accordingly based on the idea of improving the angular homogeneity of the light emitted by the light source. For this purpose, the invention provides for at least one mode scrambler to be assigned to the optical fiber, which transfers the light generated by the light source to a downstream process.

It turned out that particularly advantageous characteristics result in response to the use of a mode scrambler.

A significant advantage of the invention is that a significantly improved angular homogeneity and stability of the homogeneity of the light results in response to the use of a mode scrambler, so that negative impacts, which are based on an inhomogeneity on the light, on the measuring process and negative impacts to the optical quality of the light source are avoided or at least reduced. This has an extremely positive effect on the quality of downstream processes, for example in the semiconductor industry.

A further advantage of the invention is that suitable mode scramblers are able to be obtained as relatively simple and cost-effective components, partly also as standard components, so that an improvement of the functional reliability of the light source can be attained by using a relatively small amount of equipment.

On the one hand, the angle homogeneity, thus the uniformity with regard to the intensity of light beams emitted by the optical fibers under different angles, improves in response to the use of a mode scrambler. On the other hand, the sensitivity of the angle homogeneity on variations of the plasma is reduced.

According to the invention, it is sufficient, on principle, when an individual mode scrambler is assigned to the optical fiber. To further improve the homogeneity of the light, an advantageous further development of the invention provides for at least a first mode scrambler and at least a second mode scrambler to be assigned to the optical fiber, consecutively in fiber direction. Shape, size and design of the mode scramblers can be chosen in accordance with the respective demands within wide ranges. In this respect, an advantageous further development of the invention provides for the first mode scrambler of the optical fiber to impress curvatures comprising a larger first radius of curvature onto the optical fiber, while the second mode scrambler impresses curvatures comprising a smaller second radius of curvature onto the optical fiber. It turned out that the homogeneity of the light can be further improved in this manner.

With regard to the embodiment of the mode scrambler, an advantageous further development of the invention provides for at least one of the mode scramblers to be embodied as a winding device, around which the optical fiber or the optical fibers can be wound or are wound, respectively, generate curvatures, which alternate in fiber direction, in a plurality of windings. Such winding devices can be produced in a simple and cost-efficient manner and encompass a high effectiveness in terms of the desired purpose, namely of homogenizing the light.

Another advantageous further development of the invention provides for at least one of the mode scramblers, in particular the second mode scrambler, to be embodied as clamping device comprising two clamping plates, between which the optical fiber or the optical fibers can be clamped such that a meandering course is or will be impressed onto the optical fiber or the optical fibers. Such mode scramblers can also be produced in a relatively simple and cost-efficient manner and encompass a high effectiveness.

An extremely advantageous further development of the invention provides for the first mode scrambler to be embodied as winding device, which impresses curvatures comprising the larger first radius of curvature onto the optical fiber or the optical fibers, while the second mode scrambler is arranged downstream from the first mode scrambler in propagation direction of the light and is embodied as clamping device, which impresses curvatures comprising a smaller radius of curvature onto the optical fiber or the optical fibers. It turned out that a particularly good homogeneity of the light can be attained in this manner. On principle, however, it is also possible to interchange the mode scramblers in the above-mentioned configuration and to arrange a mode scrambler, which is embodied as winding device, downstream from a mode scrambler, which is embodied as a clamping device.

Regardless of the embodiment of the mode scramblers, another advantageous further development of the invention provides for the first mode scrambler to be arranged upstream of the second mode scrambler in propagation direction of the light.

Another extremely advantageous further development of the invention provides for provision to be made for two optical fibers, to which the mode scrambler or the mode scramblers is/are assigned, wherein a further optical fiber comprising a larger diameter is connected upstream of the optical fibers. Surprisingly, it turned out that the homogeneity of the light can further be improved significantly in this manner, in particular with regard to the angle distribution. A constellation, in the case of which the further optical fiber is connected upstream of the optical fibers on the one hand and in the case of which, on the other hand, a mode scrambler, which is embodied as winding device, is assigned initially, and, behind it, a mode scrambler, which is embodied as clamping device, to the optical fibers consecutively in propagation direction of the light.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention will be explained in more detail below by means of the enclosed highly diagrammed drawing, in which an exemplary embodiment of a light source according to the invention is illustrated. All of the described features, which are illustrated in the drawing and which are claimed in the patent claims, thereby form the subject matter of the invention, either alone as well as in any suitable combination with one another, regardless of their combination in the patent claims and regardless of their dependency as well as regardless of the description or illustration thereof in the drawings, respectively.

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views

FIG. 2 is a schematic diagram illustrating an exemplary embodiment of a first mode scrambler, which is used in the case of the light source according to FIG. 1, in a highly diagrammed manner.

FIG. 3 is a schematic diagram illustrating an exemplary embodiment of a second mode scrambler used in the case of the light source according to FIG. 1, in a highly diagrammed manner.

DETAILED DESCRIPTION

Figure 1:
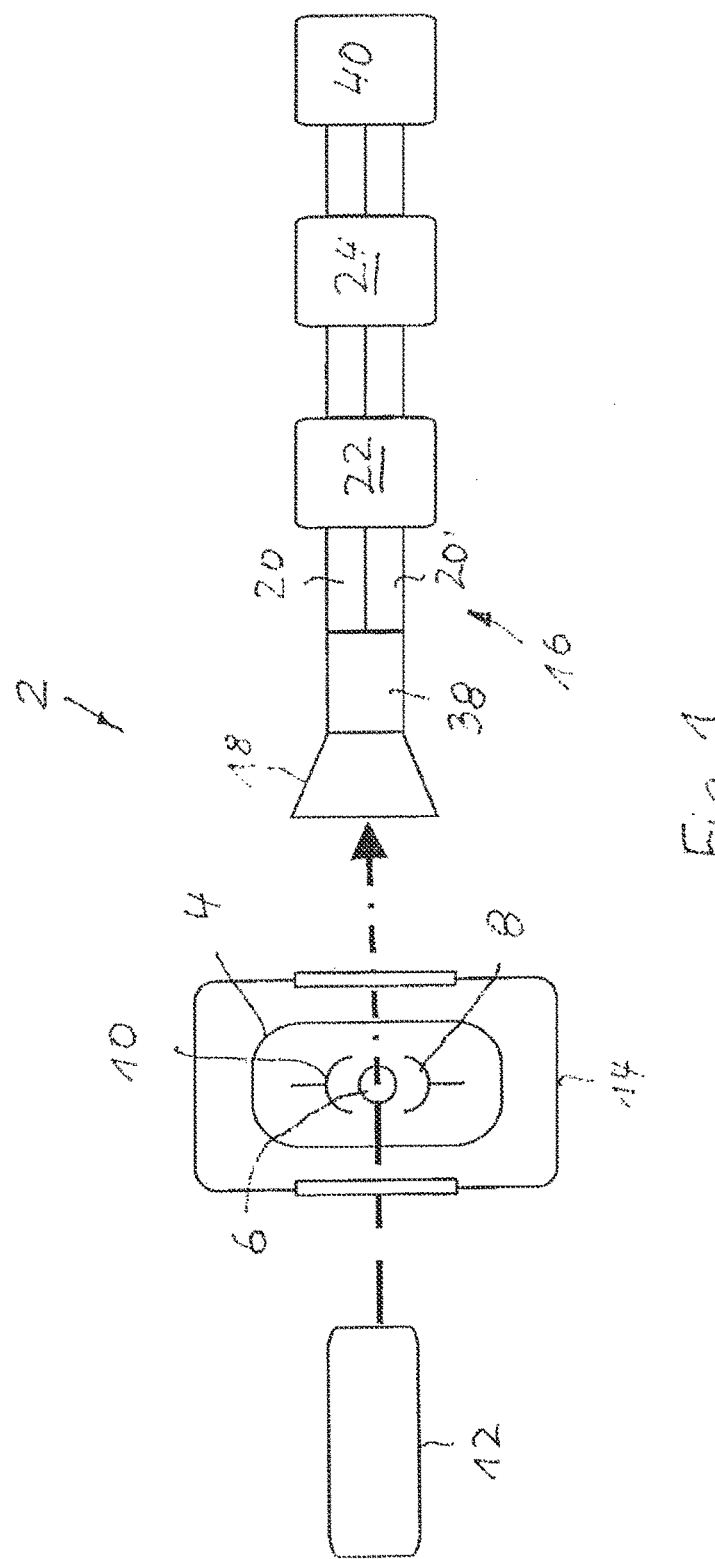
FIG. 1 is a schematic diagram illustrating an exemplary embodiment of a light source according to the invention in a highly diagrammed and block diagram-like manner.

An exemplary embodiment of a laser-operated light source 2 according to the invention, which, in the case of this exemplary embodiment, serves to generate useful light in the visible wavelength range, is illustrated in FIG. 1 in a highly diagrammed manner. In general, the phrase "useful light," or the like, as used herein, should be interpreted broadly to include any type of light that is useful for the process that the light is being delivered to. Examples include various processes in the semiconductor industry. In a typical implementation, light may be considered useful for a particular process if it is highly homogenous (e.g., over a range of angles that is suitable for the intended purpose), if it is sufficiently intense for the intended purpose, and if it is generally within a range of wavelengths that are suitable for the intended purpose. In some implementations, for example, the range of wavelengths suitable for the intended purpose extends from about 400 nm to 950 nm. In some implementations, the range of wavelengths suitable for the intended purpose extends between 400 nm to 765 nm).

The light source encompasses a chamber 4 for accommodating an ionizable gas, which is formed by Xenon in the case of the illustrated exemplary embodiment. The light source 2 furthermore encompasses an ignition source for ionizing the gas in the chamber 4 for generating a plasma 6, which is suggested diagrammatically in the drawing, wherein the ignition source is formed by a pair of electrodes 8, 10 in the case of this exemplary embodiment. The light source 2 furthermore encompasses a laser 12 for inputting laser energy into the plasma 6 such that the plasma emits useful light, which forms the output signal of the light source 2, under the impact of the laser radiation.

Although Xenon is disclosed as the gas inside the chamber 4 in the foregoing exemplary implementation, in other implementations, gases other than, or in addition to, Xenon may be used as well. In general, the gas inside the chamber 4 can be any type of gas that is able to generate plasma, under appropriate conditions, that will emit useful light in response to the laser radiation. In some implementations, the gas may include one or more noble gases.

In addition to the useful light, the plasma might possibly emit stray radiation, which, however, is of no further interest in the context according to the invention, which is considered herein, and which will thus not be considered in detail herein. For blocking the stray radiation, the light source 2 can encompass corresponding means, for example at its lamp housing 14.

For the sake of clarity, optical components of the light source 2, which serve in particular for beam steering and beam formation, of the laser radiation as well as of the emitted light, for example in the form of lenses and mirrors, have been omitted in FIG. 1.

Although the light source disclosed herein is a laser-operated light source, in some implementations, other light sources that are not laser-operated, may be used instead. The light source 2 furthermore encompasses means for coupling the useful light into a transferring optical fiber arrangement 16, wherein said means encompass a fiber coupler 18, which is only arranged schematically, in the case of the illustrated exemplary embodiment.

For transferring the useful light, the optical fiber arrangement 16 encompasses optical fibers 20, 20', which are guided parallel to one another and which guide the same useful signal with a homogeneity and intensity, which is substantially identical, if possible, which can be of significant importance in a downstream process, for example. In some implementations, the optical fibers are guided. In other implementations, they are simply arranged relative to each other so as to follow substantially parallel paths.

In the arrangement shown in FIG. 1, two optical fibers 20, 20' pass through the first and second mode scramblers 22, 24. The number of optical fibers that pass through the first and second mode scramblers 22, 24 can vary. For example, in some implementations, only one optical fiber may pass through the first and second mode scramblers 22, 24. In some implementations, more than two optical fibers 20, 20' may pass through the first and second mode scramblers 22, 24.

In a typical implementation, the optical fibers (e.g., 20, 20') that pass through the first and second mode scramblers 22, 24 are substantially similar to each other. For example, in a typical implementation, each of these optical fibers has substantially the same diameter as the other.

According to the example, at least one mode scrambler is assigned to the optical fibers 20, 20'. In the case of the illustrated exemplary embodiment, a first mode scrambler 22 is assigned to the optical fibers 20, 20', to which a second mode scrambler 24 is assigned in propagation direction of the light.

In the case of the illustrated exemplary embodiment, the first mode scrambler 24 impresses curvatures comprising a larger first radius of curvature onto the optical fibers 20, 20', while the second mode scrambler 24 impresses curvatures comprising a smaller second radius of curvature onto the optical fibers 20, 20'. In general, the larger first radius is larger than the smaller second radius. The actual dimensions of the larger first radius and the smaller second radius may depend, for example, on the size of the optical fibers. In one exemplary implementation, the larger radius is approximately 150 mm and the smaller radius is a few mm (e.g., 3 mm). Of course, these specific values can vary as well. In some implementations, for example, the larger radius can range from 125 mm to 175 mm and the smaller radius can vary from 1 mm to 5 mm.

In the case of the illustrated exemplary embodiment, the first mode scrambler 22 is embodied as a winding device, around which the optical fibers 20, 20' can be wound in a plurality of windings for generating curvatures, which alternate in fiber direction. In some implementations, each optical fiber may be wrapped around the winding device more than once. Moreover, in some implementations, one fiber may be wrapped around the winding device in first direction (e.g., clockwise), while the other fiber is wrapped around the winding device in a second direction (e.g., counterclockwise) that is opposite the first direction.

FIG. 2 shows an exemplary embodiment of a corresponding winding device 26, which encompasses two winding elements 30, 30', which are connected to one another via a web 28. In some implementations, the winding device 26 is formed as a single physical piece. In some implementations, the winding device is formed from different pieces physically attached to one another. It can be seen from FIG. 2 that the optical fibers 20, 20', which, for the sake of clarity, are illustrated in FIG. 2 as a single optical fiber, can be wound around the winding device 26 with alternating curvatures. For the sake of clarity, only a single winding is illustrated in FIG. 2. In practice, the optical fibers 20, 20' are wound around the winding device 26 in a plurality of windings.

In a typical implementation, there is a piece (not) surrounding the portion of the optical fiber that is wrapped around the winding device that helps ensure that the optical fiber follows the path indicated, along the outer contours of the winding device 26.

The embodiment of the winding device 26 according to FIG. 2 is only an example. Other winding devices can also be used. The overall winding device can have different sizes and the parts of the winding device can have different sizes relative to other parts. The overall shape of the winding device can differ from what is shown in FIG. 2 as well. For example, in some implementations, the winding device can have a heart shape. In some implementations, the winding device can have a kidney shape.

FIG. 3 shows an exemplary embodiment of the second mode scrambler 24, which, in the case of this exemplary embodiment, is embodied as clamping device 32 comprising two clamping plates 34, 34', between which the optical fibers 20, 20', which, for the sake of clarity, are illustrated in FIG. 3 again as single optical fibers are clamped, so that a meandering course comprising a smaller second radius of curvature is or will be impressed onto the optical fibers 20, 20'.

As is suggested in FIG. 3 by means of an arrow 36, the selection of the force, by means of which the optical fibers 20, 20' are clamped between the clamping plates 34, 34', it can be selected, how strongly the optical fibers 20, 20' are deformed, thus how large the second radius of curvature is. This provides for optimization of the homogeneity characteristics of the light of the light source 2, which is delivered to the downstream process from the optical fibers.

In the illustrated example, the inner surface of the upper clamping plate and the inner surface of the lower clamping plate are contoured to follow in cross-section a substantially sinusoidal path along the direction that the optical fiber passes through the clamping device 32. The sinusoidal path that the inner surface of the upper clamping plate follows is configured so that it can intimately mate with the complementary sinusoidal path that inner surface of the lower clamping plate follows. In a typical implementation, the overall length of the clamping device 32 is approximately 2-3 cm. The sinusoidal path in the exemplary configuration has four peaks. However, the number of peaks can vary, for example, between 1 peak to 7 peaks or more. In various implementations, the period and amplitude of the sinusoidal paths can vary. For example, in some implementations, the period of the sinusoidal paths can be between about 0.5 cm and 2 cm. Moreover, in some implementations, the amplitude can be up to 1 cm. Moreover, in various implementations, the path may not be sinusoidal at all—instead, it may be a saw tooth pattern, a square pattern, or the like.

In the case of the illustrated exemplary embodiment, a further optical fiber 38 comprising a larger diameter is connected upstream of the optical fibers 20, 20'. In a typical implementation, the single optical fiber 38 is connected to the pair of optical fibers 20, 20' with a fiber optical coupler. In general, a fiber optic coupler is a device used in optical fiber systems with one or more input fibers and one or several output fibers.

Via the fiber coupler 18, the useful light of the light source 2 is thus initially coupled into the further optical fiber 38 comprising a larger diameter and is transferred from it into the optical fibers 20, 20'.

It turned out that in the arrangement shown in FIG. 1, in the case of which two mode scramblers 22, 24 as well as an optical fiber 38, which is connected upstream and which comprises a larger diameter, are used, a particularly good homogenization of the light follows, which applies for the surface homogeneity as well as for the angle homogeneity of the light. In general, surface homogeneity refers to the degree of uniformity in light intensity that is being delivered for example to an end process (e.g., a surface inspection process), across a range of angles. The light homogenized in this manner is supplied to a downstream process, for example in the semiconductor industry. The downstream process is symbolized with reference numeral 40 in FIG. 1. The downstream process can be virtually any process that utilizes the light delivered to the downstream process. Examples include spectroscopy or surface inspection, for example for measuring purposes.

A number of embodiments of the invention have been described. Nevertheless, it will be understood that various modifications may be made without departing from the spirit and scope of the invention.

Other implementations are within the scope of the claims.

What is claimed is:

1. A light source, comprising:
   a chamber configured to accommodate an ionizable gas;
   an ignition source configured to ionize the gas in order to generate a plasma;
   a laser configured to input laser energy into the plasma such that, under impact of the laser energy, the plasma emits light that forms an output signal of the light source;
   a fiber optical configured to couple the light into a plurality of optical fibers; and
   a first mode scrambler and a second mode scrambler corresponding to at least one optical fiber of the plurality of optical fibers,
   wherein the plurality of optical fibers comprises:
      first and second optical fibers corresponding to the first and second mode scramblers and
      a third optical fiber:
         in optical communication with the first optical fiber and the second optical fiber,
         comprising a larger diameter than a diameter of both of the first optical fiber and the second optical fiber; and
         connected upstream of the first optical fiber and the second optical fiber,
   the first, second, and third optical fibers, the first mode scrambler, and the second mode scrambler apply a surface homogeneity and an angle homogeneity to the light.

2. The light source according to claim 1, wherein the first mode scrambler and the second mode scrambler are assigned consecutively in fiber direction.

3. The light source according to claim 2, wherein:
   the first mode scrambler impresses curvatures comprising a larger first radius of curvature onto one or more of the plurality of optical fibers, and
   the second mode scrambler impresses curvatures comprising a smaller second radius of curvature onto one or more of the plurality of optical fibers.

4. The light source according to claim 2, wherein the first mode scrambler is embodied as a winding device configured to receive at least one of the plurality of optical fibers wound around the winding device for generating alternating curvatures consecutively in fiber direction in a plurality of windings.

5. The light source according to claim 4, wherein:
   the first mode scrambler is embodied as a winding device, which impresses curvatures comprising a larger first radius of curvature onto one or more of the plurality of optical fibers, and
   the second mode scrambler, which is embodied as a clamping device, is arranged downstream from said first mode scrambler and impresses curvatures comprising a smaller second radius of curvature onto one or more of the plurality of optical fibers.

6. The light source according to claim 2, wherein the second mode scrambler is embodied as a clamping device comprising two clamping plates configured to clamp at least one of the plurality of optical fibers between the two clamping plates in a meandering course.

7. The light source according to claim 2, wherein the first mode scrambler is arranged upstream of the second mode scrambler in propagation direction of the light.

8. The light source according to claim 1, wherein the light is light having a wavelength between 400 nm and 950 nm.

9. The laser-operated light source of claim 1, wherein:
   the first optical fiber and the second optical fiber are configured to be guided parallel to one another, and
   the first optical fiber and the second optical fiber are configured to receive the light from the fiber optical coupler with a homogeneity and intensity which is substantially identical.

10. A method comprising:
igniting an ionizable gas inside a chamber with an ignition source to generate a plasma;
inputting laser energy to the plasma such that, under the impact of the laser energy, the plasma emits light that forms an output signal of a light source;
passing the light into a plurality of optical fibers; and
passing one or more of the plurality of optical fibers through a first mode scrambler and a second mode scrambler,
wherein the plurality of optical fibers further comprises:
  a first optical fiber and a second optical fiber to which the first mode scrambler and the second mode scrambler are assigned, and
  a third optical fiber:
    in optical communication with the first optical fiber and the second optical fiber,
    comprising a larger diameter than a diameter of the first optical fiber and a diameter of the second optical fiber, and
    connected upstream of the first optical fiber and the second optical fiber,
  the first, second, and third optical fibers, the first mode scrambler, and the second mode scrambler apply a surface homogeneity and an angle homogeneity to the light.

* * * * *